Jan. 15, 1963   T. A. MILLER   3,072,965
APPARATUS FOR CASTING HOLLOW ARTICLES
Filed Sept. 20, 1954   5 Sheets-Sheet 1

INVENTOR.
THEODORE A. MILLER
BY
Oldham & Oldham
ATTORNEYS

INVENTOR.
THEODORE A. MILLER
BY Oldham & Oldham
ATTORNEYS

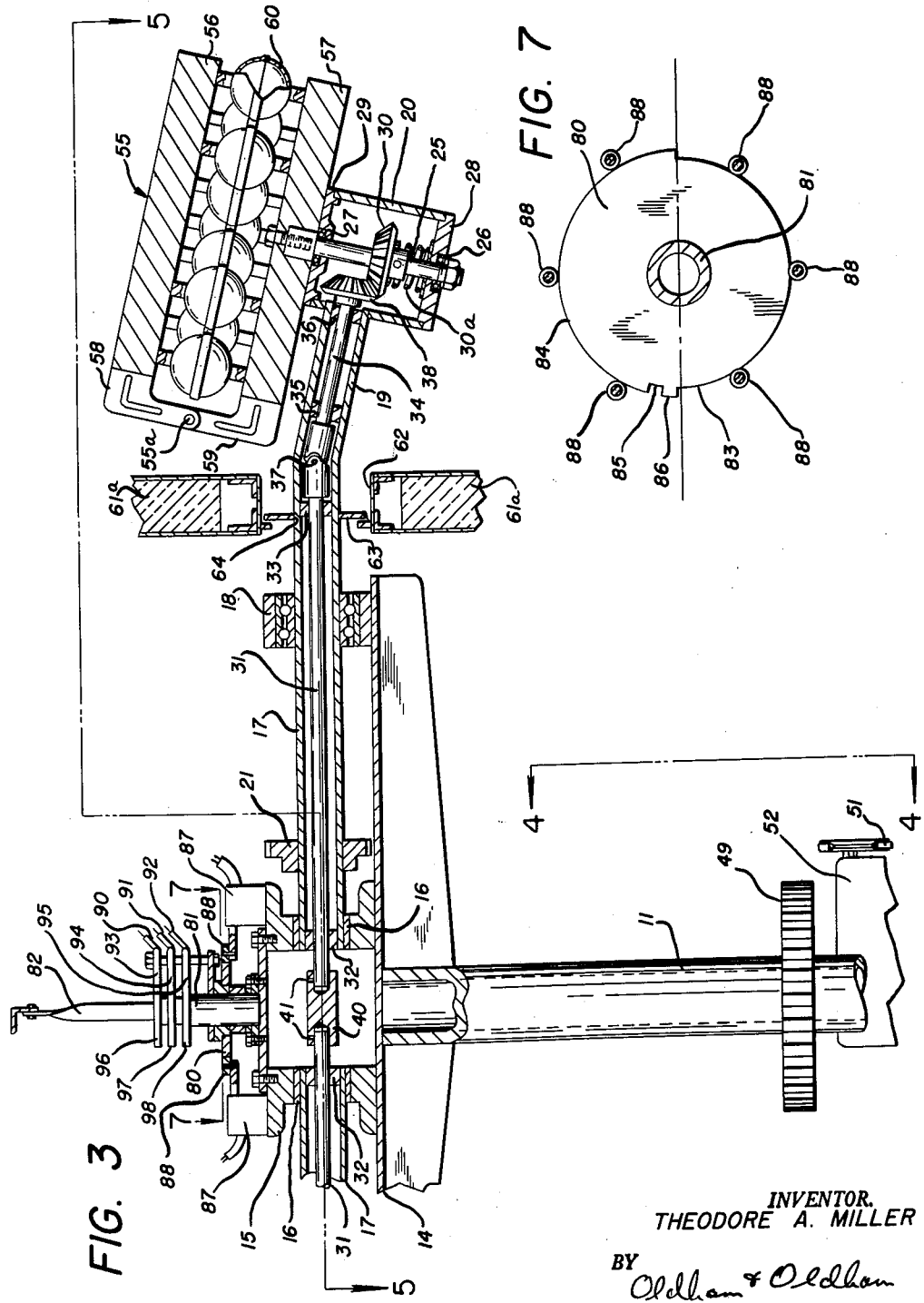

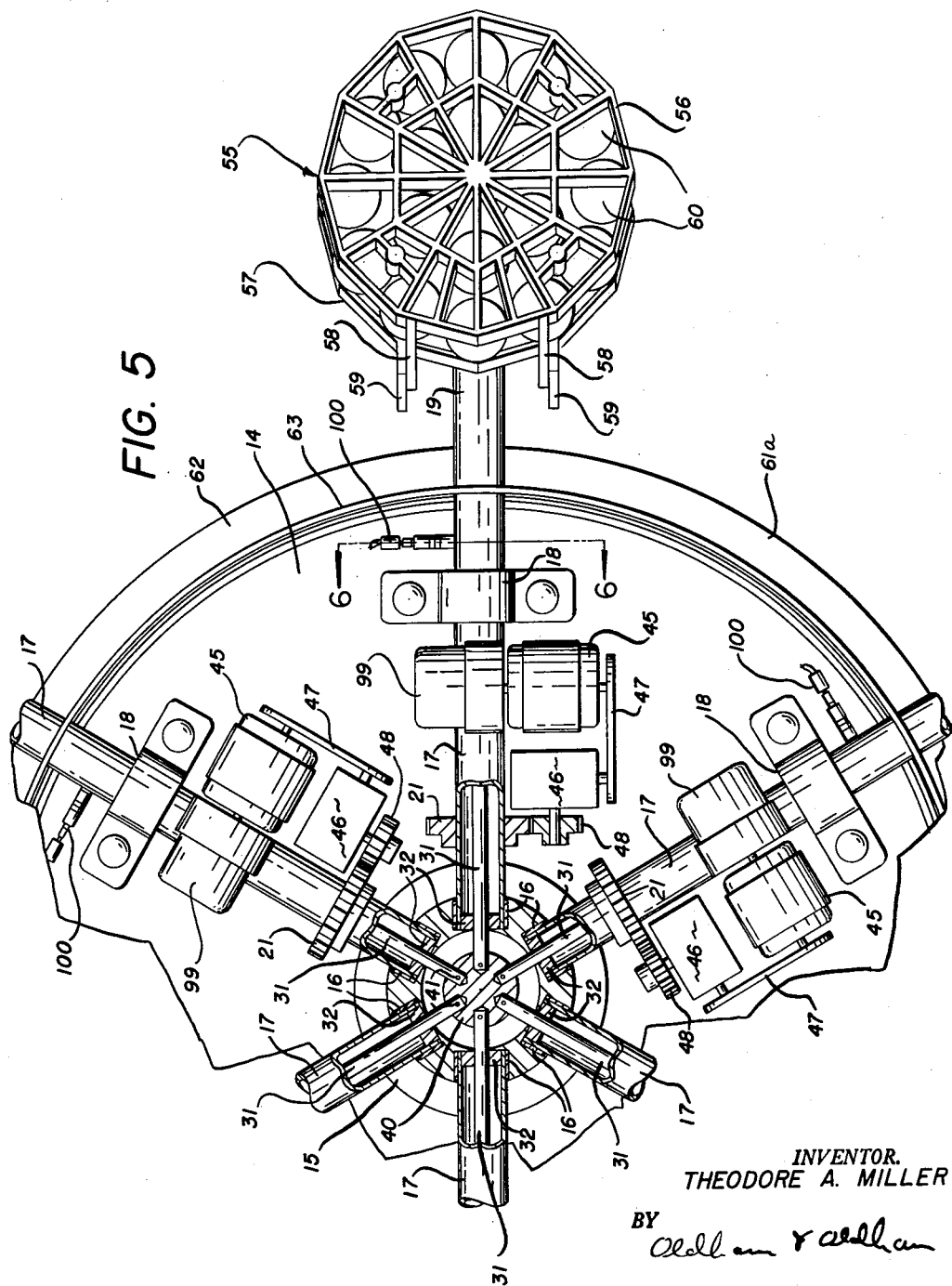

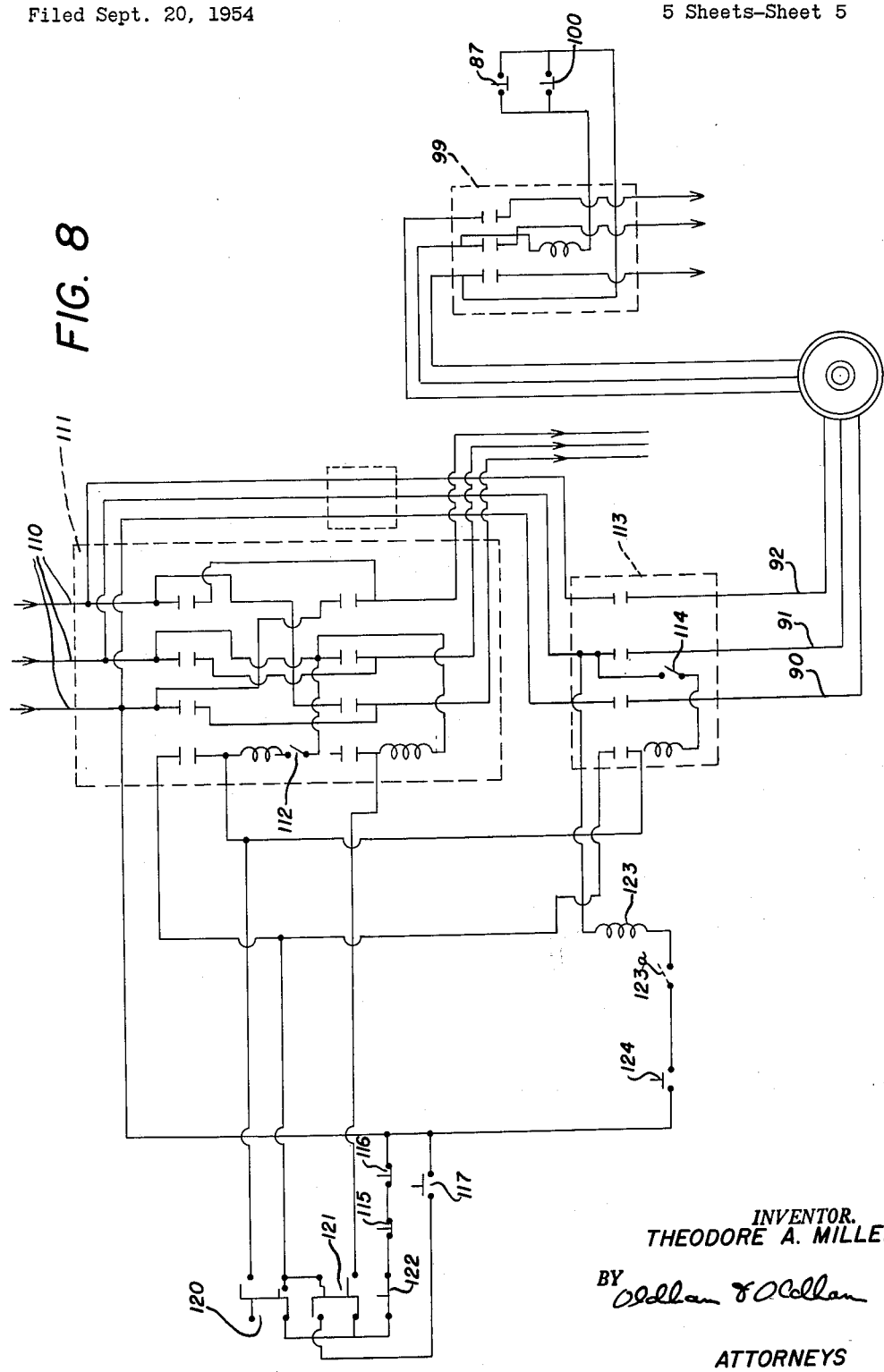

3,072,965
Patented Jan. 15, 1963

United States Patent Office

3,072,965
APPARATUS FOR CASTING HOLLOW ARTICLES
Theodore A. Miller, 2038 Main St.,
Cuyahoga Falls, Ohio
Filed Sept. 20, 1954, Ser. No. 457,082
10 Claims. (Cl. 18—26)

This invention relates to the casting of hollow plastic articles, and is especially useful in forming hollow articles by coating the cavities of molds with a liquid solution or dispersion of thermosetting plastic material, such as is commonly called plastisol, while the molds are rotated about a plurality of axes and subjected successively to heating and cooling.

It is an important object of the present invention to provide for rotating a mold about an axis while conveying it along a course and simultaneously providing a rocking movement of the mold in a multiplicity of directions crosswise of its axis of rotation to uniformly distribute deposit of material over the inner face of the mold.

It is a further object of the invention to so support the mold for rotative and rocking movements, that no portion of the surface of the mold is ever on dead center and all portions of the mold surface are continuously in motion.

Still another object of the invention is to so manipulate the molds that a unitary number of rocking movements of the molds take place in a non-unitary number of revolutions of the mold about an axis so that repetition of paths of rocking movement is avoided in consecutive rotational cycles of the mold.

It is a further object of the invention to provide a series of molds permanently supported for manipulation about a multiplicity of axes, and to automatically so manipulate them while progressively subjecting them to heating and cooling operations.

Another object of the invention is to so incline the axes about which the molds rotate as to maintain all surfaces of the molds in continuous movement.

Another object of the invention is to provide for automatically rotating the molds about a multiplicity of axes at determinate velocities of rotation in different planes to more uniformly distribute the coating material.

A still further object of the invention is to provide for reversal of direction of rotation of the molds about one axis of rotation during travel of the molds along a course.

A further object is to provide for uniform and efficient heating and cooling of the molds.

A still further object is to provide for continuous transitional movement of the molds about a course while rotating them about a multiplicity of axes throughout one portion of the course and restraining them from such rotation in another portion of the course and presenting them in a determinate attitude throughout the second portion of the course for unloading and loading purposes.

These and other objects will appear from the following description, reference being made to the accompanying drawings.

Of the drawings, in whch like parts are designated by like designating numerals:

FIG. 3 is a vertical sectional detail view of the apparatus, taken on line 3—3 of FIG. 2, showing the mold and its manipulating mechanism, parts being broken away and parts shown in section;

FIG. 5 is a detail plan view of the turntable and one of the molds, showing the mold-manipulating mechanism, the view being taken in section on line 5—5 of FIG. 3;

FIG. 7 is a sectional detail plan view, taken on line 7—7 of FIG. 3 showing the mold-rotation timing cam; and FIG. 8 is a wiring diagram of the mold-manipulating motor circuits.

Figure 1:
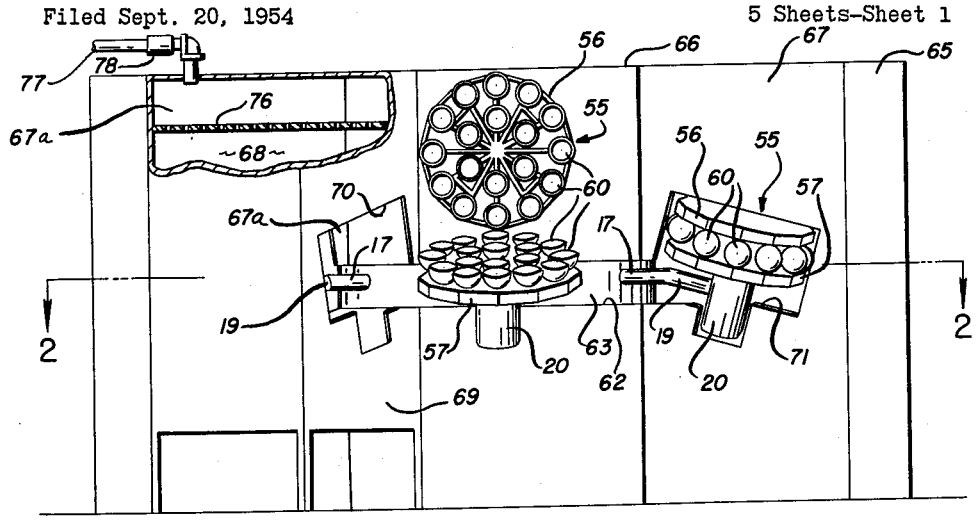
FIG. 1 is a front elevation of an apparatus constructed in accordance with and embodying the invention showing one of the molds in open position at the loading and unloading position, portions of the cooling chamber being broken away and shown in section.
Figure 4:
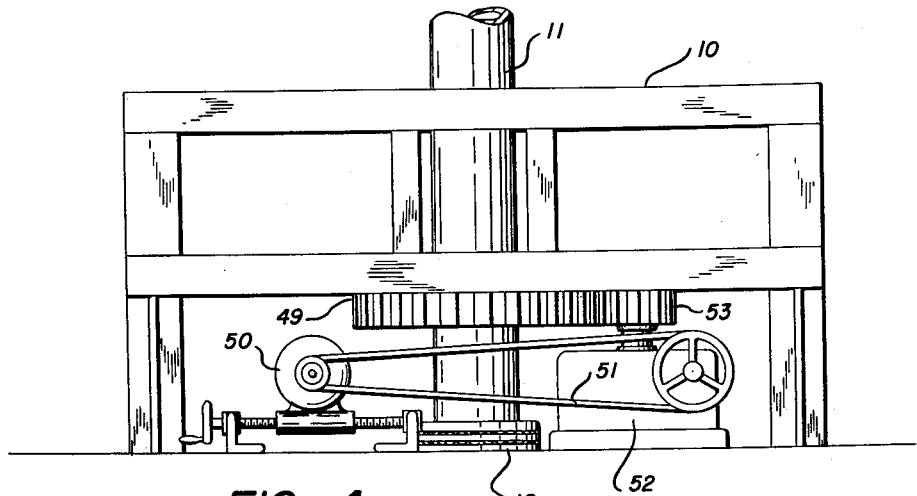
FIG. 4 is a detail elevational view of the supporting frame and the turntable drive, portions being broken away and portions shown in section.
Figure 6:
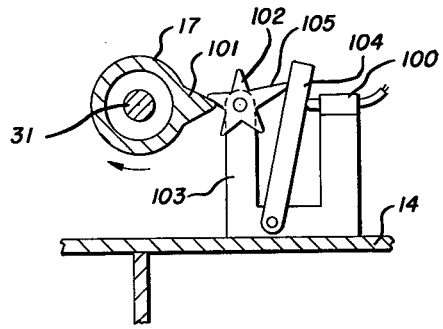
FIG. 6 is a detail sectional view, taken on line 6—6 of FIG. 5 showing the mold attitude rectifying timer.

Referring to the drawings, which illustrate one embodiment of the invention, the numeral 10 designates a machine frame having bearings for supporting for rotation about a vertical axis a spindle 11. A thrust bearing 12 rests upon the floor and supports the spindle. A turntable 14 is fixed to the upper end of the spindle 11 for rotation therewith. An annular bearing member 15 is mounted concentrically on the table 14 and has a multiplicity of equally-spaced bearings 16 for rotatably receiving a multiplicity of hollow shafts 17 which have their axes horizontal or radial of the table. Each shaft 17 is also journaled in a bearing 18 mounted at the perimeter of the table, there being a bearing 18 for each shaft. Each hollow shaft 17 has a tubular extension or dog leg 19 integral therewith, whose axis is inclined at an acute angle of about 12 degrees to the axis of the shaft 17. The extension 19 has a cylindrical housing 20 secured to its outboard end and having its axis at 90 degrees to the axis of the extension 19. The arrangement is such that the projected axis of shaft 17 intersects the projected axis of the cylindrical housing at an angle acute thereto.

Each shaft 17 has a gear 21 fixed thereto for driving it and as it rotates about its axis it will be apparent that the axis of its extension 19 will sweep a conical path so that the direction of the axis of the extension is constantly changing. It is also apparent that the axis of cylindrical housing 20 will also sweep a conical path during such movement. A mold-carrying spindle 25 is mounted axially of housing 20 on bearings 26, 27 carried by end plates 28, 29, respectively, which are secured to the ends of the housing.

The molds 55, later referred to, are carried by spindles 25 at the end of each spindle nearer the projected axis of its supporting shaft 17, with the mold cavities out of alignment with the projected axis of such spindle 17, so that no mold cavity is on the center line of its spindle 17.

For providing rotation of spindles 25, each spindle has a bevel gear 30 secured thereto against rotation by a feather key. A shaft 31 is rotatably mounted axially within hollow shaft 17 and supported therefrom by bearings 32, 33. A shaft 34 is mounted for rotation axially within the extension 19 and supported therefrom by bearings 35, 36. A universal joint coupling 37 connects shafts 31 and 34. A bevel gear 38 is fixed to shaft 34 and meshes with gear 30. All of the shafts 31 are held against rotation by being secured to a disc 40 which has a multiplicity of radial sockets equally spaced thereabout for receiving the ends of the shafts which are secured in the sockets by set screws 41. The arrangement is such that with shaft 31 held stationary for each revolution of hollow shaft 17 thereabout, gear 30 will roll once about gear 38. While different ratios of the gears 30 and 38 may be employed in the illustrated embodiment of the invention, gear 38 and gear 30 are so chosen that, at one revolution of hollow shaft 17, spindle 25 and consequently mold will be rotated one and a half revolutions.

A coil spring 30a is mounted under tension between end plate 28 and gear 30 to hold gear 30 in mesh with gear 38.

For driving each shaft 17 independently of the others, an electric motor 45, there being one motor for each shaft, is mounted on the table 14 and drives a speed reducer 46 through a belt 47. A gear 48 on the speed reducer meshes with gear 21 on the shaft. It will be understood that there is a motor speed reducer and gearing for driving each shaft 17. The motors are reversable and are controlled as hereinafter explained.

For rotating the table 14 independently of rotative movements of the molds, a gear 49 is fixed to spindle 11. An electric motor 50 drives a belt 51 which in turn drives a speed reducer 52. A gear 53 on the speed reducer meshes with gear 49 on spindle 11 and drives the table continuously at a speed usually of from four to five revolutions per hour.

The motor 50 is mounted for adjustment toward and from speed reducer 52 and has a drive pulley of adjustable pitch diameter, whereby the velocity of the table may be increased or decreased to provide longer or shorter heating of the molds.

The molds are of the spider-type and each mold 55 comprises an upper plate 56 and a lower plate 57 each of open grid form and having hinge lugs 58, 59, respectively, hinged to each other by a pintle 55a. Mating cavities 60 for forming the articles and corresponding in shape to the desired articles are mounted on plates 56, 57 for mating with each other. The arrangement is such that a minimum amount of metal is needed for the molds and ample circulation is provided about and between the cavities to facilitate rapid heating and cooling. Each lower plate 57 is mounted on one of the spindles 25 for movement therewith. Bolts or other locking means are provided for securing the upper and lower mold plates against hinging.

During the molding operation, it is desirable first to heat the molds, then to cool them. For this purpose, an enclosure, or oven 61 of arcuate extent is provided about the turntable 14 throughout about 240 degrees of travel thereabout.

Figure 2:
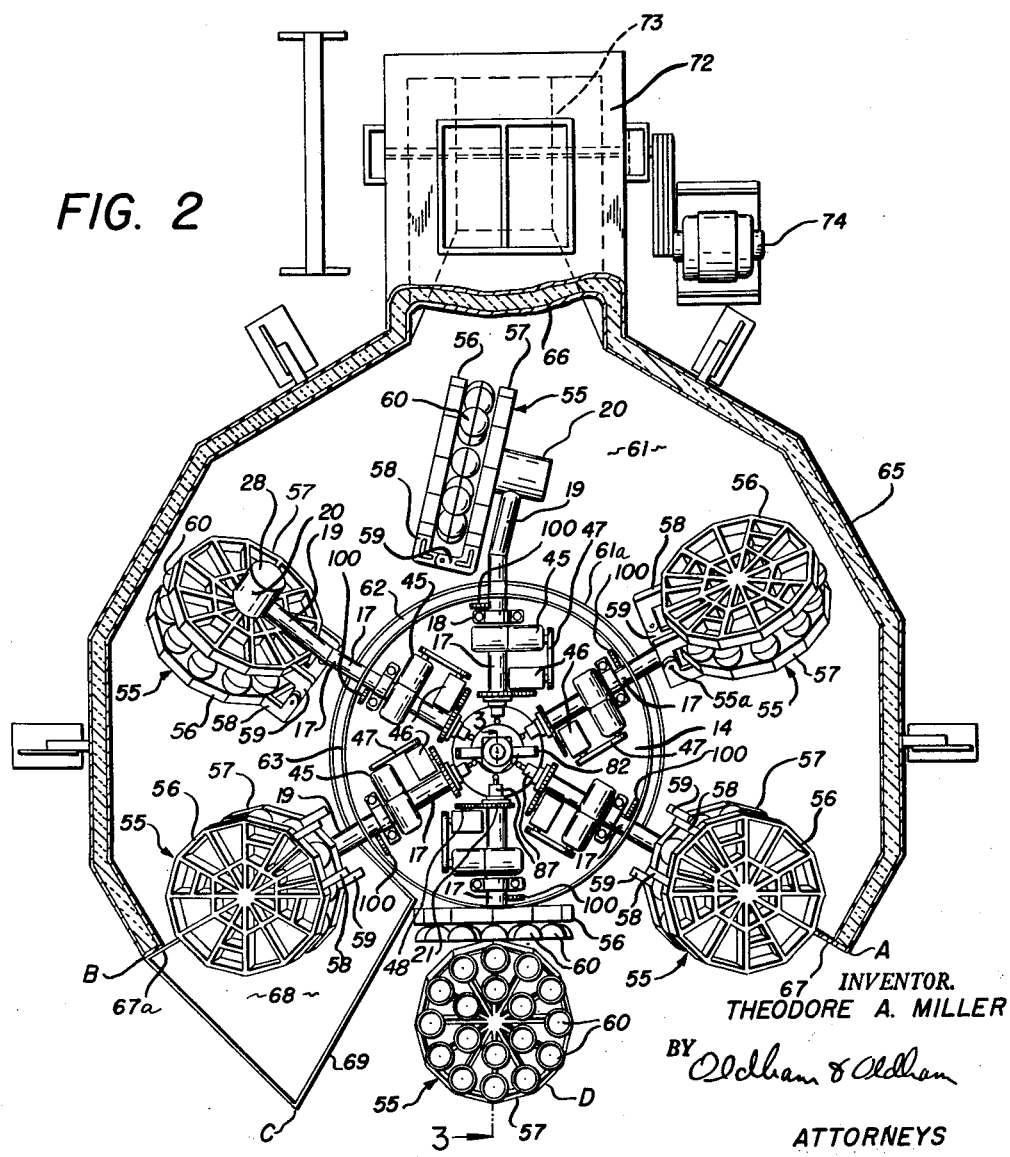
FIG. 2 is a sectional plan view of the apparatus, taken on line 2—2 of FIG. 1.

The oven 61 has an inner wall 61a having a continuous annular gap 62 for passing the hollow shafts 17. A band ring 63 has openings 64 therethrough for clearing the shafts 17 which support it and the band is aligned with the gap 62 and prevents escape of heat. An outer wall 65 is spaced outwardly from wall 61a and a top wall 66 connects the walls and provides a tunnel which clears the molds at all attitudes thereof. As viewed in FIG. 2 the heating oven 61 extends through an angle of rotation of the table of 240 degrees from the position A, counterclockwise to the position B. From position B to position C a cooling chamber 68 is provided and position D indicates the loading station.

Vertical end walls 67 and 67a are provided at the ends of the heating oven and an end wall 69 is provided at the end of the cooling chamber 68. These end walls must permit the molds to pass and for this purpose are formed with openings 70, 71 of such shape as to clear the molds only when the upper plates of the molds are upward and horizontal as seen in FIG. 1. This arrangement conserves the heat of the oven.

The oven has a rearward extension 72 (see FIG. 2) in which are mounted a blower 73 driven by a motor 74. Also provided are electric heating elements which heat the air drawn from outside the enclosure and delivered to the oven. All walls of the oven are of double-walled construction with heat insulation in the wall cavities, to provide for conservation of heat.

The cooling chamber 68 has a perforated horizontal baffle plate 76 spaced from the side walls of the chamber above which cooling water is supplied, as from a supply by a pipe 77 having a solenoid-operated valve 78. The water is distributed by the perforations and runs over the molds, being collected by a tray at the bottom of the chamber.

The invention provides for rotating the shafts 17 and thereby the molds about a multiplicy of axes including the axis of the shaft 17, the axis of the shaft 34 and the axis of the spindle 25 throughout travel of the molds through the oven and for discontinuing such rotative movements and presenting the molds at the desired attitude for passing the openings at the end walls of the oven and cooling chamber and for loading and unloading. For this purpose, a stationary cam 80 is supported concentric to the table by being journaled on a post 81 supported from bearing member 15, and is prevented from rotating by anchor straps 82 supported by the oven. The cam 80, as seen in FIG. 7, has a lower or innermost dwell 83 of substantially 180 degrees, a raised dwell 84, a notch 85 and a short raised dwell 86. Mounted on the annular member 15 are a plurality of normally open limit switches 87, one for each motor 45 and equally spaced about the member 15. The rollers 88 of the roller arms of these switches ride the cam 80. When each roller is on the dwells 84 and 86 its corresponding motor is energized and rotates the corresponding shaft 17. When the roller is on the lower dwell 83 or in the notch 85, its motor is de-energized, provided that a shunt switch 100, hereinafter mentioned, is also open at that position.

Power for supplying the circuits of motors 45 is supplied by power lines 90, 91, 92, through brushes 93, 94, 95 mounted on cam 80, to collector rings 96, 97, 98. These collector rings are connected to each motor 45 through a magnetic circuit closer 99 adapted to be closed by closing of its limit switch 87, there being one circuit closer for each motor circuit. A second limit switch 100, normally closed, is connected in parallel to switch 87 and is mounted on table 14 near hollow shaft 17. A cam projection 101 is provided on the shaft 17 in position to engage and rotate a star wheel 102, rotatably mounted on a bracket 103 secured to table 14, one tooth at each revolution of shaft 17. The star wheel has five points, one of which extends further radially than the others. An arm 104 is pivotally mounted on bracket 103 so as to extend between the star wheel and limit switch 100. The arrangement is such that any of the points of the star wheel standing in the way of cam 101 will cause the star wheel to rotate one-fifth revolution for each rotation of shaft 17 in either direction, however, none of the points except the longer point 105 will engage the lever 104 and move it to open switch 100. The cam 101 is so arranged relative to the star wheel 102 that the mold will be at the correct attitude to pass through openings 70, 71 when the longer point 105 is horizontal and the switch 100 is open.

Considering that one of the molds is at the position D, the loading position, its switch 100 will be held open by its star wheel and as switch 87 will also be open, due to being on the low dwell 83 of cam 80, its motor will be de-energized. After the mold travels past wall 67, switch 87 will be engaged by the leading shoulder of the cam and will ride up on the high dwell 84 thereof closing switch 87 and starting its motor 45. Whereupon the shaft 31 is rotated and turns the mold over and over about the axis of shaft 31. It will be noted that the mold may travel about the vertical axis of the turntable more than 180 degrees within the oven while rotating about the axis of shaft 31 without interference, whereas the total raised dwell of the cam 80 is not more than 180 degrees. It follows that before 180 degrees travel of the mold within the oven, switch 87 will be opened by dropping into notch 85.

The turntable 14, in the illustrated embodiment, rotates at the very slow speed range of four to five revolutions per hour and therefore takes from 1.4 to 2.5 seconds to rotate one degree, whereas the shafts 17 rotate at about 10 r.p.m. and therefore make one revolution in about 6 seconds, so that a mold will turn over a complete revolution in about three degrees of travel of the table and may turn over five revolutions in about fifteen degrees of rotation of the table. Whenever a switch 87 is opened by dropping into notch 85 or by dropping off raised dwell 86, its corresponding motor 45 will be stopped immediately if the long point 105 of its star wheel is holding switch 100 open. If the switch 100 is closed at that time motor 45 will continue to run until the mold is at the correct attitude to pass the opening in a partition of the oven or cooling chamber, at which position the long point of star wheel 105 will open switch 100. This will occur at no more than five revolutions of shaft 17 or no more than fifteen degrees of rotation of the table. The switch mechanism, just described, will operate in the same manner independently of the direction of rotation of the motors 45 and this is of advantage where the mold cavities are of such shape as to coat more uniformly when the mold is rotated in a particular direction.

The rotation of shafts 17 are stopped as the molds approach the partition between the oven and the cooling chamber by the limit switch 87 associated with each mold dropping into notch 85 of the cam 80. After the mold is within the cooling chamber the limit switch 87 is closed by the raised dwell 86 of the cam and the mold is again rotated within the cooling chamber. As the mold approaches the end wall of the cooling chamber, switch 87 is again opened by dropping off of raised dwell 86 onto the low dwell 83 of cam 80 and opening of switch 100 by rotation of the shaft 17 not over five revolutions to bring the star wheel to the stopping position.

Power for operating the table-rotating and spindle-rotating motors is supplied by lines 110. The power for table-rotating motor 50 is controlled through a magnetic reversing starter 111. Branch lines supply power independently through a magnetic starter 113 to lines 90, 91 and 92 which feed collector rings 96, 97, 98. Each motor 45 is controlled through an individual magnetic starter 99 mounted on table 14 and controlled by switches 87 and 100 as hereinbefore described.

A toggle switch 112 is provided in the circuit of magnetic starter 111 so that rotation of table 14 in a forward direction may be stopped by hand independent of rotation of shafts 17. A toggle switch 114 is provided in the starter circuit of magnetic starter 113 so that operation of motors 45 may be manually stopped independent of operation of the table 14.

Limit switches 115, 116 are provided in the circuit of starter 111 and are normally closed. They are positioned at openings 70, 71 of the oven in position to be opened by contact with a mold not properly aligned for passing the opening. Also a normally open switch 117 is located in the reverse running circuit of starter 111 and must be manually closed if reversal of travel of the table is desired.

Starter 111 is ordinarily controlled by a running switch 120, a reverse switch 121 and a stop switch 122.

A solenoid valve 78 on the water line to the cooling chamber has its solenoid 123 across lines 110. A normally closed hand-operated switch 123a in series with the solenoid may be opened to shut the valve and a normally open limit switch 124, also in series with the solenoid, is located near the cooling cabinet in position to be closed to turn on the water by an oncoming mold support.

In the operation of the apparatus, the turntable is rotated continuously in one direction. The molds are each presented in horizontal attitude at the loading station where a quantity of the liquid dispersion is deposited in each mold cavity in any desirable manner. The liquid does not fill the mold. The mold is then closed and clamped shut. As the mold enters the oven, which is heated to the desired temperature, its controlling limit switch 87 closes energizing its motor 45. The shaft 17 is then rotated at about ten revolutions per minute about its axis. At the same time, the mold is rotated about the axis of spindle 25 at about fifteen revolutions per minute and concurrently the mold is tipped in one direction and then in another through an angle of about twenty-four degrees to the horizontal, in a rocking movement of ten complete cycles for ten revolutions of the shaft 17. The molds are carried slowly around with the turntable and are heated during their passage through the oven.

Due to the fact that the dog leg ends 19 of shafts 17 are inclined at an angle of about twelve degrees and the molds are mounted for rotation about an axis normal to the axis of ends 19, each mold is rocked back and forth through a total angle of about twenty-four degrees completing a rocking cycle at each revolution of shaft 17. This flows the plastisol or plastic dispersion in the mold to be flowed up and down over the mold wall in synchronism with the rocking movements. As the molds are simultaneously rotated about their axes at a different velocity from the rotation of shafts 17, the number of rocking cycles corresponding to one revolution of the mold may be so controlled by choosing the dimensions of gears 30, 38 that the number of rocking cycles per revolution of the mold is a number of units plus or minus a fraction and phases of rocking movement will not occur at the same position relative to the mold in consecutive revolutions of the mold. This results in the flow of the plastisol over the mold faces in successive flows during one revolution of the mold which are out of phase with flows during a preceding revolution.

The nature of the plastisol or plastic dispersion is such that when gradually raised in temperature it first jells and eventually thermosets. The successive flows over the interior of the mold cavities result in deposit of the jelled plastisol in layers, or laminations, and it will be apparent that any flow margins will be non-coincidental and that cross-grainal laminations may result in the molded article providing additional strength.

These movements result in the liquid being evenly distributed as a coating over all the walls of the mold regardless of the shape of the mold. The heat causes the coating to be thermoset in place.

The molds then pass through the cooling chamber where they are cooled by the water running through and over the spider-shaped molds.

While, for purposes of illustration, the mold cavities have been shown of spherical shape, these cavities may be of any desired shape and the apparatus has been found particularly advantageous where elongate molds for forming irregular toy figures and the like are to be made as the rotation of the mold about a multiplicity of axes simultaneously in different directions and concurrent tipping of the mold assures a solid uniform coating in all portions of the mold.

The provision for reversing the direction of rotation of the molds further assists in providing a uniform deposit. Moreover, the movements of the molds are uniform and continuous throughout the heating period.

During this movement each mold rotates about its own axis while that axis is constantly rotated about a point of that axis in a manner such that the axis is a generatrix of a cone and concurrently therewith the mold is rotated about a second axis acute to the first axis and intersecting it at the apex of the cone so generated. By constantly changing the axis of rotation the coating material is flowed around the interior of the mold in constantly changing directions so that successive layers of deposit are laid in non-parallel relation providing an article free from grain. Also, during such movement, the molds are conveyed about an arcuate path whose axis is perpendicular to the second said axis to move the molds from a loading station through a heating oven and a cooling chamber.

The spider-type mold provides a mold structure of light weight and relatively small mass as compared to its size and its open construction provides for quick heating and cooling.

Variations may be made without departing from the spirit and scope of the invention, as it is defined by the following claims.

I claim:

1. Apparatus for simultaneously supporting and rotating a mold about a plurality of axes while continuously changing the angular position of one of the axes to change the direction of flow over the mold surface of a liquid enclosed by the mold, said apparatus comprising a supporting shaft having a hollow first portion rotatable about its own axis and a hollow second mold supporting portion extending therebeyond at an angle acute to the axis of said first portion, a mold rotating spindle mounted for rotation on said mold-supporting portion with its axis acutely inclined to the axis of said first portion and intersecting the axis of the first portion, a nonrotatable shaft extending coaxially through said first portion, driving means connecting said mold-rotating spindle in driving relation to said nonrotatable shaft for rotating said spindle upon rotation of said supporting shaft, a closable mold mounted on said spindle and having a mold cavity radially outward of the axis of said spindle, means for rotating said supporting shaft at a speed permitting gravitational flow of a liquid contained in said mold cavity over the surface of said mold cavity, and means for moving the supporting shaft and mold to and from a heating zone.

2. Apparatus for simultaneously supporting and rotating a mold about a plurality of axes while continuously changing the angular position of one of the axes to change the direction of flow over the mold surface of a liquid enclosed by the mold, said apparatus comprising a supporting shaft having a hollow first portion rotatable about its own axis and a hollow second mold supporting portion extending therebeyond at an angle acute to the axis of said first portion, a mold rotating spindle mounted for rotation on said mold-supporting portion with its axis acutely inclined to the axis of said first portion and intersecting the axis of the first portion, a nonrotatable shaft extending coaxially through said first portion, driving means connecting said mold-rotating spindle in driving relation to said nonrotatable shaft for rotating said spindle upon rotation of said supporting shaft, a closable mold mounted on said spindle and having a mold cavity radially outward of the axis of said spindle, means for rotating said supporting shaft at a speed permitting gravitational flow of a liquid contained in said mold cavity over the surface of said mold cavity, said driving means including on each pin, said spreaders each carrying a roller on an axis parallel to the pin axis, an end member secured to each pin normal thereto and within the spreaders, means biasing the spreaders away from said end members and gears of unequal pitch diameters for changing relative rotational speeds of said supporting shaft and said spindle, and means for moving the supporting shaft and mold to and from a heating zone.

3. Apparatus for conveying a series of molds about an annular course while simultaneously rotating each mold about a plurality of axes while continuously changing the angular position of one of the axes throughout a portion of said course to change the direction of flow over the mold surface of a liquid enclosed by the mold, said apparatus comprising a supporting head rotatable about a vertical axis, a plurality of supporting shafts extending radially from said head in horizontal directions, each supporting shaft having a hollow first portion rotatable relative to said head about its own axis and a hollow second mold supporting portion extending therebeyond at an angle acute to the axis of said first portion, a mold rotating spindle mounted for rotation on each said mold supporting portion with its axis acutely inclined to the axis of its said first portion and intersecting the axis of said first portion, a nonrotatable shaft extending coaxially through each said first portion and nonrotatably secured to said head, driving means connecting each said mold rotating spindle in driving relation to its said nonrotatable shaft for rotating said spindle upon rotation of said supporting shaft, a closable mold mounted on each mold supporting spindle and having a mold cavity radially outward of the axis of said spindle, means for rotating said head about its vertical axis, and shaft-rotating means on said head individual to each supporting shaft for rotating it during rotation of said head about a portion of said course at a speed permitting gravitational flow of a liquid contained in its supported mold cavity over the surface of said cavity.

4. Apparatus for conveying a series of molds about an annular course while simultaneously rotating each mold about a plurality of axes while continuously changing the angular position of one of the axes throughout a portion of said course to change the direction of flow over the mold surface of a liquid enclosed by the mold, said apparatus comprising a supporting head rotatable about a vertical axis, a plurality of supporting shafts extending radially from said head in horizontal directions, each supporting shaft having a hollow portion rotatable relative to said head about its own axis and a mold supporting portion extending therebeyond at an angle acute to the axis of said hollow portion, a mold rotating spindle mounted for rotation on each said mold supporting portion with its axis acutely inclined to the axis of its said hollow portion and intersecting the axis of said hollow portion, a nonrotatable shaft extending coaxially through each said hollow portion and nonrotatably secured to said head, driving means connecting each said mold rotating spindle in driving relation to its said nonrotatable shaft for rotating said spindle upon rotation of its supporting shaft, a closable mold mounted on each mold supporting spindle and having a mold cavity radially outward of the axis of said spindle, means for rotating said head about its vertical axis, shaft-rotating means on said head individually to each supporting shaft for rotating its hollow portion during rotation of said head about a portion of said course at a speed permitting gravitational flow of a liquid contained in its supported mold cavity over the surface of said cavity, and means in the path of rotation of said head for starting and stopping said shaft rotating means at positions in the rotational course of said head, said starting and stopping means including means for stopping rotation of said supporting shafts with the molds in a desired attitude.

5. Apparatus for simultaneously supporting and rotating a mold about a plurality of axes, said apparatus comprising a continuous and hollow shaft having a first portion rotatable about its own axis and a second portion rigidly attached to and extending beyond said first portion at an angle acute to such axis, said second portion terminating in a housing, a nonrotatable shaft extending axially within said first portion, an intermediate shaft mounted in said second portion, a universal coupling connecting said nonrotatable and intermediate shafts, a mold-supporting spindle rotatably mounted in said housing with its axis acutely inclined to the axis of rotation of said first portion and intersecting the axis of said first portion of said hollow shaft, meshing gears on said intermediate shaft and said spindle for driving one from the other, means for rotating said hollow shaft and means for moving the hollow shaft to and from a heating zone.

6. Apparatus for casting hollow articles by deposit from a liquid dispersion of thermo-setting plastic material, said apparatus comprising a mold having an axis, motor means for moving said mold about an annular course through a heating oven, a second motor means having an axis of rotation for turning said mold about said axis of rotation over and over continuously during its travel about said course, the axis of said mold being supported at an acute angle relative to the axis of rotation of said mold turning means, said oven having end walls having openings therethrough arranged to pass said mold only in a specific attitude, and control means for stopping the turning movement of the mold with the mold at said specific attitude preceding passage of said mold through said openings, said control means comprising a stationary cam, a control mechanism including a limit switch in the circuit of said second motor means movable along said course with said mold and engageable by said cam for stopping and starting the turning movement of said mold at desired positions adjacent said openings, and a second control mechanism movable along said course with said mold cooperating with the first said control mechanism in stopping said mold in the desired specific attitude to clear one of said openings.

7. Apparatus for supporting and manipulating molds, said apparatus comprising a turntable, variable speed driving means for rotating the turntable, mold-supporting means at spaced positions about said turntable, molds supported thereby for movement through an oven, said oven having restricted openings therein for entrance and exit of molds only in a desired attitude, independent driving motor means on said turntable for rotating each mold support independently of rotation of the others and of said turntable, throughout its travel about the turntable and means jointly controlled by rotation of said turntable and rotation of said mold support for stopping rotation of each of said motor means and its mold supports and presenting the molds at a desired attitude for passing the openings of said oven.

8. Apparatus supporting and manipulating molds, said apparatus comprising a turntable, hollow mold-supporting shafts extending radially thereof at spaced positions thereabout, each mold-supporting shaft having an outer end portion extending at an angle acute to the portion radially inward thereof, a mold rotatably mounted on said end portion about an axis acute to and intersecting the axis of rotation of its mold-supporting shaft, a universally jointed shaft within said hollow supporting shaft and geared to said mold, means for rotating said turntable, and means independent of rotation of said turntable for rotating said hollow shaft and said mold continuously during travel about said turntable.

9. In apparatus for casting hollow articles by deposit of thermosetting plastic material of the type having a carrier movable along an annular course, a mold supporting and manipulating means mounted on said carrier for movement therewith and a mold mounted on said supporting and manipulating means, mold supporting and manipulating means comprising a non-rotatable shaft supported across said course for movement therealong in a direction normal to its axis, a hollow shaft having a first portion coaxial with and rotatable about said non-rotatable shaft and a second portion extending acute to the axis of rotation of said hollow shaft beyond the end of the non-rotatable shaft and terminating in a housing, a mold supporting spindle rotatably mounted in said housing with its axis acute to and intersecting the axis of rotation of said hollow shaft, driving means extending through said second portion of said hollow shaft and connecting said spindle to said non-rotatable shaft whereby rotation of said hollow shaft about said non-rotatable shaft causes rotation of said spindle and the mold supported thereby, and means for rotating said hollow shaft independent of said movement of said carrier.

10. In apparatus for casting hollow articles by deposit of thermosetting plastic material of the type having a carrier movable along an annular course, a mold supporting and manipulating means mounted on said carrier for movement therewith and a mold mounted on said supporting and manipulating means, mold supporting and manipulating means comprising a non-rotatable shaft supported across said course for movement therealong in a direction normal to its axis, a hollow shaft having a first portion coaxial with and rotatable about said non-rotatable shaft and a second portion extending acute to the axis of rotation, of said hollow shaft beyond the end of the non-rotatable shaft and terminating in a housing, a mold supporting spindle rotatably mounted in said housing with its axis acute to and intersecting the axis of rotation of said hollow shaft, driving means extending through said second portion of said hollow shaft and connecting said spindle to said non-rotatable shaft whereby rotation of said hollow shaft about said non-rotatable shaft causes rotation of said spindle and the mold supported thereby, said connecting means comprising an intermediate shaft rotatably journalled in said second portion of the hollow shaft, a universal joint coupling between said non-rotatable shaft and said intermediate shaft, and cooperating bevel gears on said intermediate shaft and said spindle, and independent motor means for driving said hollow shaft independent of movement of said carrier.

References Cited in the file of this patent

UNITED STATES PATENTS

| | | |
|---|---|---|
| 1,998,897 | Kay | Apr. 23, 1935 |
| 2,060,962 | Twiss | Nov. 17, 1936 |
| 2,222,266 | Rubissow | Nov. 19, 1940 |
| 2,389,319 | McMordie | Nov. 20, 1945 |
| 2,603,836 | Rempel | July 22, 1952 |
| 2,659,107 | De Bell | Nov. 17, 1953 |
| 2,681,472 | Rempel | June 22, 1954 |